United States Patent [19]

Hege et al.

[11] Patent Number: 5,434,763
[45] Date of Patent: Jul. 18, 1995

[54] HEADLIGHT FOR MOTOR VEHICLES

[75] Inventors: Guenter Hege, Gomaringen; Thomas Froelich, Reutlingen; Ulrich Drews, Vaihingen; Thomas Kienzler, Reutlingen, all of Germany

[73] Assignee: Robert Bosch GmbH, Stuttgart, Germany

[21] Appl. No.: 192,646

[22] Filed: Feb. 7, 1994

[30] Foreign Application Priority Data

Mar. 30, 1993 [DE] Germany .................. 43 10 307.3

[51] Int. Cl.⁶ .................................................. F21K 7/00
[52] U.S. Cl. ........................................ 362/265; 362/61; 362/226
[58] Field of Search ................. 362/61, 80, 263, 265, 362/310, 226

[56] References Cited

U.S. PATENT DOCUMENTS 5,188,444 2/1993 Makita et al. ..................... 362/80
5,343,370 8/1994 Ohashi et al. ..................... 362/61

FOREIGN PATENT DOCUMENTS 4135020 11/1992 Germany .

Primary Examiner—Stephen F. Husar
Attorney, Agent, or Firm—Michael J. Striker

[57] ABSTRACT

A headlight for vehicles has a light source formed as a gas discharge lamp, a ballast unit connected with the gas discharge lamp and producing high voltage, and a unit for preventing dispersion of electromagnetic radiation caused by the gas discharge lamp. The unit includes an electrical filtering circuit arranged near the gas discharge lamp and having a plurality of components, and a housing surrounds at least a part of the components of the electrical filtering circuit.

4 Claims, 2 Drawing Sheets

HEADLIGHT FOR MOTOR VEHICLES

The present invention relates generally to headlights for motor vehicles.

More particularly, it relates to a headlight which has a light source formed as a gas discharge lamp and connected through electrical conductors with a ballast unit for producing a high voltage, and also means for preventing dispersion of electromagnetic radiation produced by the gas discharge lamp.

Such a headlight is disclosed for example in the German document DE 41 35 020 A1. In this headlight the gas discharge lamp is connected through electrical conductors with a ballast unit provided for high voltage supply and composed for example of an ignition part for producing the high voltage and a control part for insuring a stable region of the gas discharge lamp. The gas discharge lamp generates during operation electromagnetic radiation which propagates through the conductors and radiates in the surrounding area of the headlight. This electromagnetic radiation not only disturbs the radio broadcast reception in the vehicle provided with the headlight, but also can cause disturbances in other electronic devices, such as for example motor control devices. In the known headlight the gas discharge lamp and the ballast unit are arranged in a housing of the headlight which is formed electrically conductive for screening of the electromagnetic disturbing radiation. The housing is composed therefore of metal or synthetic plastic material provided with an electrically conductive coating, or the synthetic plastic material is provided with electrically conductive admixtures. The screening of the whole headlight housing requires therefore high expenses.

SUMMARY OF THE INVENTION

Accordingly, it is an object of the present invention to provide a headlight for vehicles, which avoids the disadvantages of the prior art.

In keeping with these objects and with others which will become apparent hereinafter, one feature of the present invention resides, briefly stated, in a headlight in which means for preventing dispersion of the electromagnetic radiation is formed as an electrical filtering circuit arranged near the gas discharge lamp, and at least a part of components of the electrical filtering circuit is enclosed by a housing.

When the headlight is designed in accordance with the present invention, the filtering circuit arranged near the gas discharge lamp prevents the dispersion of the electromagnetic radiation extending from the gas discharge lamp, and no additional steps for screening the disturbing radiation are required. The filtering circuit involves only low additional expenses and requires only low mounting volumes.

In accordance with another feature of the present invention, the components surrounded by the housing are cast with a synthetic plastic mass which fills the housing. The headlight produced in accordance with these features is especially inexpensive to manufacture.

In accordance with still a further feature of the present invention the housing is formed as a plug part which is connectable with a socket of the gas discharge lamp and provides the connection of the gas discharge lamp with the conductors. In this construction the filtering circuit is integrated in the available plug part, which additionally reduces the manufacturing expenses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
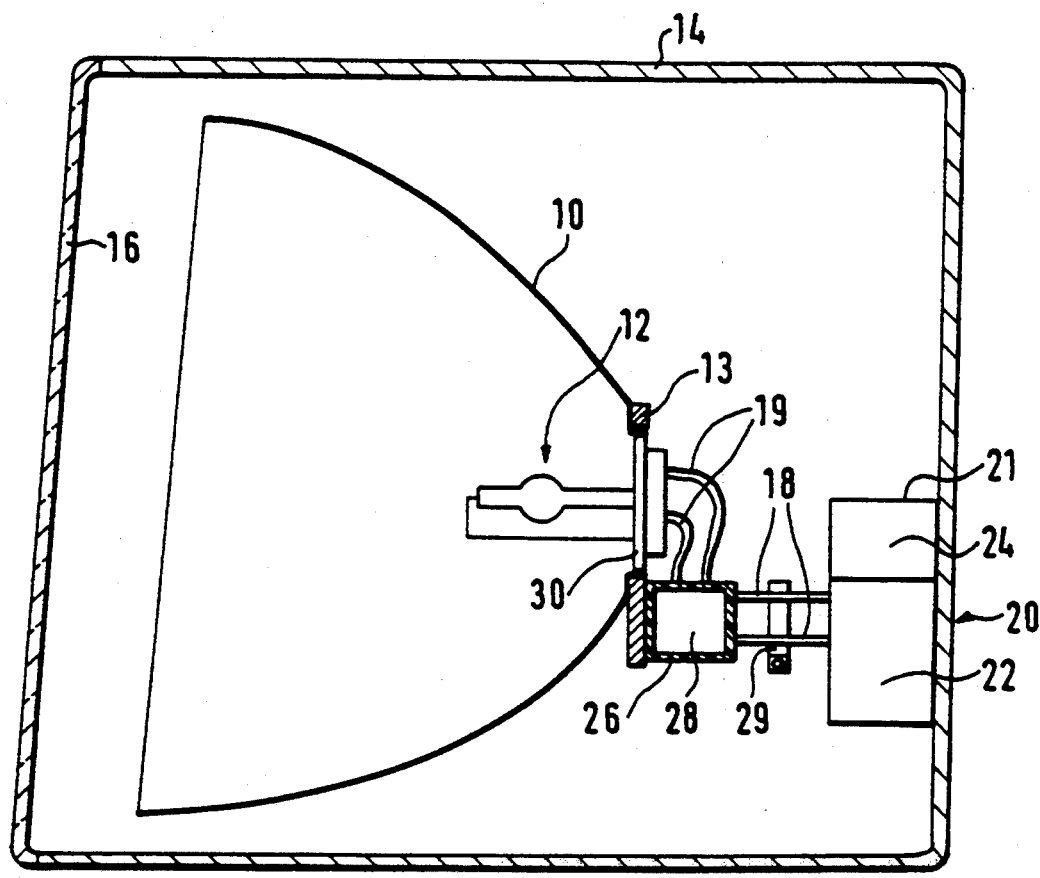
FIG. 1 is a view showing a headlight in accordance with the present invention, in a vertical cross-section and in simplified representation in accordance with a first embodiment of the invention.
Figure 2:
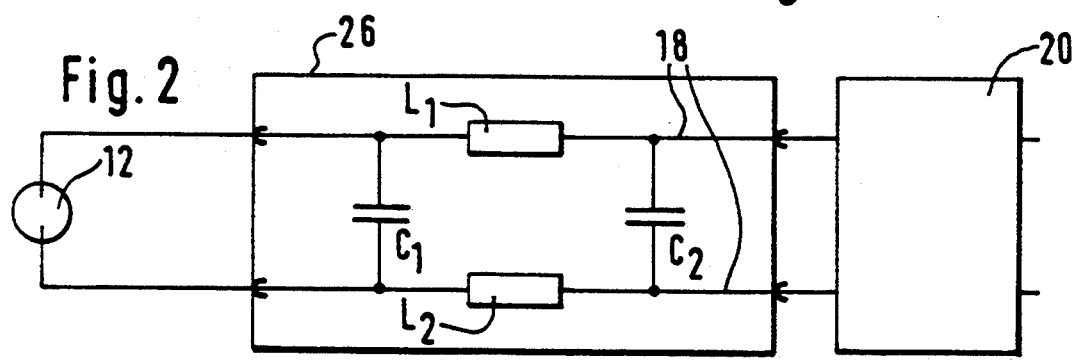
FIGS. 2, 3, 4, 5 show various embodiments of an electronic filtering circuit of the headlight in accordance with the present invention.
Figure 6:
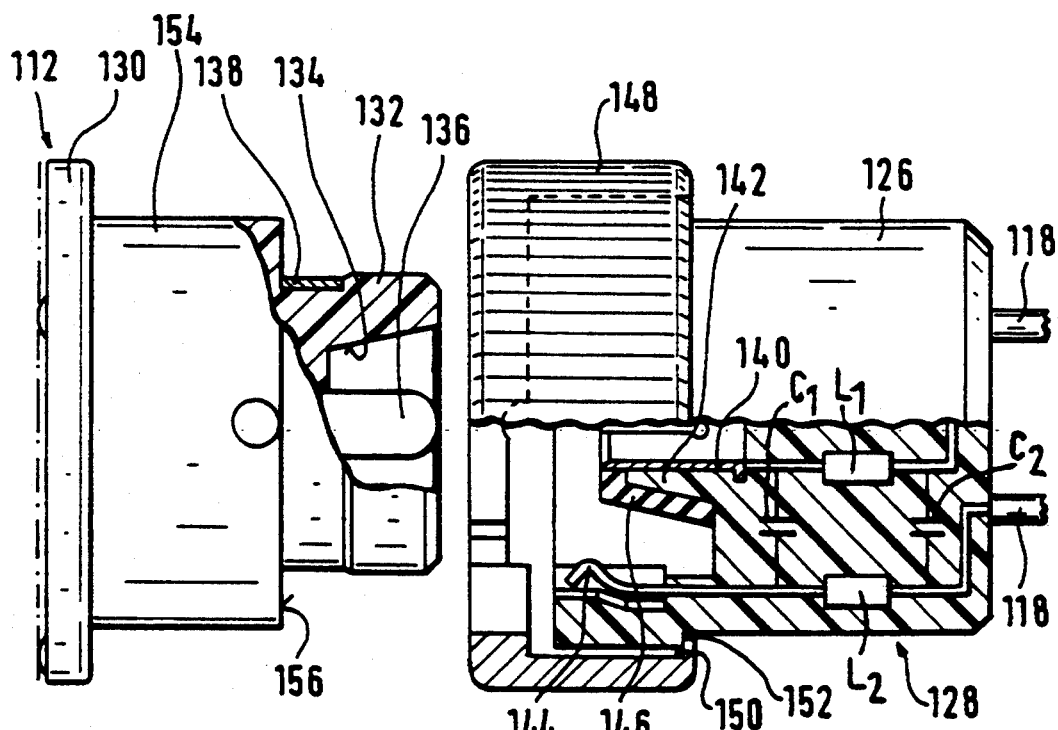
FIG. 6 is a view showing a section of the headlight in accordance with the second embodiment of the present invention.

A headlight for vehicles, particularly for motor vehicles, as shown in FIGS. 1 and 6 has a reflector 10 and a gas discharge lamp 12 arranged in an apex region of the reflector. The gas discharge lamp 12 is mounted in the reflector 10 through a lamp support 13. The lamp support 13 can be composed of metal, ceramic or synthetic plastic. The reflector 10 can be arranged adjustably in a housing 14. The housing 14 has a front opening which is closed by a transparent cover disc 16. The gas discharge lamp 12 is connected via two electrical conductors 18 in form of cables with a ballast unit 20. The ballast unit 20 is provided for producing a high voltage required for the operation of the gas discharge lamp 1, from the low voltage of the electrical system of the vehicle. The ballast unit 20 includes an ignition part 22 for producing the high voltage, and a control part 24 which serves for insuring a stable operation of the gas discharge lamp 12. The ballast unit 20 has a housing 21 which is composed of synthetic plastic or metal and is screened. At least the ignition part 22 of the ballast unit is arranged inside the headlight housing 14 for maintaining the conductors 18 which conduct the high voltage as short as possible.

In the first embodiment shown in FIG. 1 the gas discharge lamp 12 has short connecting cable pieces 19 which extend from a base 30 and are connectable for example by plug or clamp connection with the conductors 18.

A housing 26 which is arranged as close to the gas discharge lamp 12 as allowed by the mounting conditions, accommodates an electronic filtering circuit 28. The conductors 18 or the connecting cable pieces 19 of the gas discharge lamp 12 extend through the housing 26 which is composed of electrically insulating material for example synthetic plastic. The housing 26 can be also composed of another suitable material, for example metal. The housing 26 in the first embodiment of the invention is held on the lamp support 13. However, in a not shown embodiment it can be held on the headlight housing 14. It can be also provided with holders 29 for the conductors 18 so as to suspend it in the headlight housing 14. In this case additional holding of the housing 26 can be dispensed with since due to the weight of the housing 26 through the conductors 18 no high forces can be transmitted to the gas discharge lamp 12. The electronic filtering circuit 28 prevents the dispersion of the electromagnetic radiation which is produced by the gas discharge lamp 12 during its operation. The electromagnetic radiation is caused by area-ignition peaks of the gas discharge lamp 12.

FIGS. 2-5 show several embodiments of the electronic filtering circuit 28. In all embodiments the filtering circuit 28 has passive components for preventing the dispersion of high frequency pulses. In the embodiment shown in FIG. 2 the filtering circuit 28 includes inductive components L1 and L2 connected in series with the conductors 18 and capacitive components C1 and C2 connected in parallel between both conductors 18 before and after the inductive components. All components L1, L2, C1, C2 are arranged inside the housing 26 and preferably cast with synthetic plastic mass which fills the housing 26. The inductive components L1 and L2 can be formed for example as bar core chokes having a bar-shaped ferrite core surrounded by a coil winding. The inductive action of the core must be maintained up to over several hundredth megahertz. Preferably the core material of the bar core chokes has a damping action. The inductivity values of the inductive components L1 and L2 is preferably between 5 $\mu H$ and 400 $\mu H$.

The capacitive components C1 and C2 can be formed preferably as ceramic capacitors. The capacitive value of the capacitors C1 and C2 is substantially in the region between 5 pF and 150 pF. For providing a reliable ignition of the gas discharge lamp 12, it is advantageous when the capacity value of the capacitors during the start of operation of the gas discharge lamp 12 are lower and increase during reaching of the nominal voltage. The components L1, L2, C1, C2 and their mounting with the housing 26 are designed in high voltage stable manner to withstand the occurring high voltages which can reach over 15 kV without any damage. Moreover, the components must have a temperature resistance up to substantially 100° C.

Figure 3:
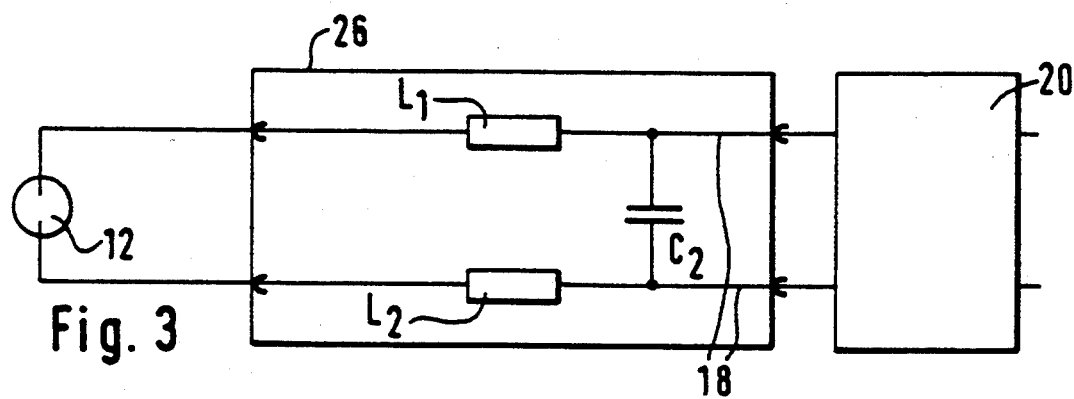

In the second embodiment of the filtering circuit 28 shown in FIG. 3 in each conductor 18 an inductive component L1 and L2 is arranged in series, as in the first embodiment. A capacitive component C2 is connected in parallel with the ballast unit 20 between the conductors 18. All components L1, L2, and C2 are arranged inside the housing 26.

Figure 4:
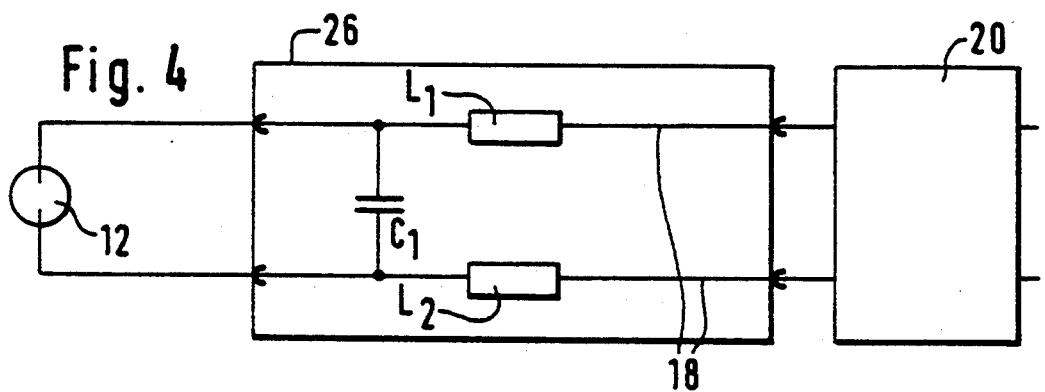

In the third embodiment of the filtering circuit shown in FIG. 4 both inductive components L1 and L2 connected in series with the conductors 18 are provided and additionally a capacitive components C1 connected in parallel to the gas discharge lamp 12 is provided between the conductors 18. All components L1, L2 and C1 are arranged inside the housing 26.

Figure 5:
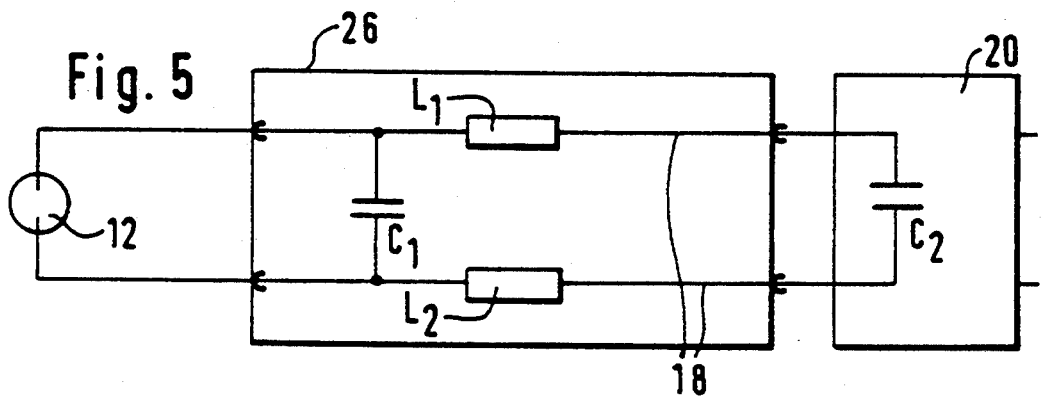

In the fourth embodiment of the filtering circuit 25 shown in FIG. 5 both inductive components L1 and L2 and both capacitive components C1 and C2 are arranged in principle similarly to the first embodiment. In deviation from the first embodiment, the capacitive components C2 is however arranged not in the housing 26, but instead in the housing 21 of the ballast unit 20 or in the housing of its ignition part 22.

FIG. 6 shows a second embodiment of the headlight in accordance with the present invention. Its construction in principle is similar to the construction of the first embodiment and therefore the parts of the headlight of the second embodiment which have not been changed with respect to the first embodiment are not identified. In deviation from the first embodiment, the gas discharge lamp 112 has a base 130 with a circular-cylindrical portion 132 facing away from the reflector 10. The base 130 is composed of an electrically non-conductive material, such as synthetic plastic or ceramic. A depression 134 is formed starting from an end side of the portion 132 facing away from the reflector 10. It conically reduces toward the reflector 10. A plug connection 136 for one of the electrodes of the gas discharge lamp 112 extends substantially centrally in the depression 134 through the base 130 and is formed in this embodiment as a round plug pin. However, it can be formed as a flat plug pin or can have another shape. A closed metallic conductor ring 138 is arranged on the periphery of the portion 132 and is connected with another electrode of the gas discharge lamp 112. The housing 126 in which at least a part of the components of the electrical filtering circuit 128 is arranged and designed in accordance with the embodiments of the filtering circuits described in connection with the first embodiment, is formed as a plug part which can be connected with the base 130 of the gas discharge lamp 112. The plug part 126 is composed of an electrically non-conductive material, for example synthetic plastic. However, it can be composed of ceramic as well.

A first contact element 140 connected through the inductive component L1 with one of the conductors 118 is arranged in the plug part 126 and formed as a round plug sleeve. The round plug pin 136 extending through the base 130 can be inserted in the round plug sleeve. The round plug sleeve 140 is surrounded with a part 142 of the plug part 126 which conically reduces in the mounting direction of the plug part 126. It engages into the depression 134 in the portion 132 of the base 130. Further, a second contact element 144 is arranged in the plug part 126. It is formed as an elastically deformable contact arm which is radial with respect to the mounting direction of the plug part 126 and is connected through the inductive component L2 with the other conductor 118. During the mounting of the plug part 126 the contact arm 144 comes to abutment against the conductor ring 138 arranged on the outer periphery of the portion 132, with a prestress. The contact arm 144 is separated from the round plug sleeve 140 by the conical part 142 of the plug part 126 so that between these both electrical contacts no spark discharge can occur. In addition, a seal 146 of elastic material, for example rubber, is arranged between the conical part 142 of the plug part 126 and the depression 134, so as to improve the reliable safety against spark discharge.

A plug part 126 is surrounded by a mounting ring 148 which is coaxial to it and is mountable on the base 130 of the gas discharge lamp 112, for example by a bayonet connection, a thread connection and the like. The mounting ring 148 can be composed of synthetic plastic or metal and has a radially inwardly extending ring shoulder 150. The ring shoulder engages in the mounting direction of the plug part 126 with a radially outwardly extending ring shoulder 152 of the plug part 126 and holds it in abutment against the base 130 in the mounting direction. The base 130 has a further circular-cylindrical portion 154 which is connected with the portion 132 and extends toward the reflector 10. It has a greater diameter than the portion 132. The plug part 126 comes to abutment against the base 130, either with its end surface at the ring shoulder 156 which faces away from the reflector 10 and is formed at the transition between both portions 132 and 154, or with the end surface of the part 142 surrounding the round plug sleeve 140 at the base of the depression 134. The mounting of the mounting ring 148 is performed on the portion 154. The components L1, L2 and C1 and/or C2 of the filtering circuit 124 are cast with synthetic plastic in the plug part 126 between the contact elements 140 and 144 and the conductors 118, as schematically shown in FIG. 6.

It will be understood that each of the elements described above, or two or more together, may also find a useful application in other types of constructions differing from the types described above.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A headlight for vehicles, comprising a light source formed as a gas discharge lamp; a ballast unit connected with said gas discharge lamp and producing high voltage; means for preventing dispersion of electromagnetic radiation caused by said gas discharge lamp, said means including an electrical filtering circuit arranged near said gas discharge lamp and having a plurality of components; and a housing surrounding at least a part of said components of said electrical filtering circuit.

2. A headlight as defined in claim 1; and further comprising electrical conductors which connect said gas discharge lamp with said ballast unit, said components of said filtering circuit including inductive components each connected in series with a respective one of said conductors, and at least one capacitive component connected in parallel between said conductors.

3. A headlight as defined in claim 1; and further comprising a synthetic plastic mass which fills said housing in which said components are cast.

4. A headlight as defined in claim 1; and further comprising conductors which connect said gas discharge lamp with said ballast unit, said gas discharge lamp having a base, said housing being formed as a plug part which is connectable with said base of said gas discharge lamp and produces a connection of said gas discharge lamp with said conductors.

* * * * *